Oct. 20, 1942.   C. G. KRONMILLER   2,299,580
COMBINATION SWITCH
Filed April 6, 1939

Inventor
Carl G. Kronmiller
By George H. Fisher
Attorney

Patented Oct. 20, 1942

2,299,580

UNITED STATES PATENT OFFICE 2,299,580

COMBINATION SWITCH

Carl G. Kronmiller, Minneapolis, Minn., assignor to Minneapolis-Honeywell Regulator Company, Minneapolis, Minn., a corporation of Delaware Application April 6, 1939, Serial No. 266,331

21 Claims. (Cl. 200—138)

This invention is directed to the field of automatic switching mechanisms and has as one of its objects to improve that type of mechanism wherein a pair of switches are sequentially operated by a condition sensitive element; such as, for example, a combination fan and high limit control actuated by means of a temperature sensitive device.

A further object is to provide for individually adjusting both the switch closing and switch opening temperatures for each switch and to provide strain release connections whereby the temperature sensitive device can continue its movement to actuate one switch after the other switch has already been actuated.

A still further object is to provide a mechanical interlock between the adjusting means for the fan and limit switches so that the fan switch can never be adjusted to close at a temperature higher than that at which the limit switch is adjusted to open.

It is also within the purview of this invention to make the adjusting means for the opening value of the high limit switch removable so that this adjustment will be continuously under the control of the fan switch adjusting means through the mechanical interlock. It is also an object of the invention to make this interlock adjustable so that an adjustable differential may be maintained between the temperature at which the fan switch closes and that at which the limit switch opens.

One of the uses to which such a mechanism may be put is to control a hot air heating system where a fan is used to force the circulation of heated air through the house. In such a case the actuating thermostat for the two switches is placed in the bonnet of the furnace and the high limit switch is wired in series with the main controlling thermostat (usually in one of the rooms) to limit the temperature of the air at the furnace. The fan switch controls the operation of the fan and is usually set to keep the fan deenergized when the air in the bonnet is cool, and as soon as it warms up sufficiently to heat the house the fan switch closes to circulate the warm air through the house. It is obviously undesirable to set the fan switch to close at a higher temperature than that at which the limit switch opens because after the limit switch opens the temperature tends to decrease and hence the fan switch would never close.

These and other subjects will readily become apparent as the following description is read in the light of the accompanying drawing in which.

Figure 1:
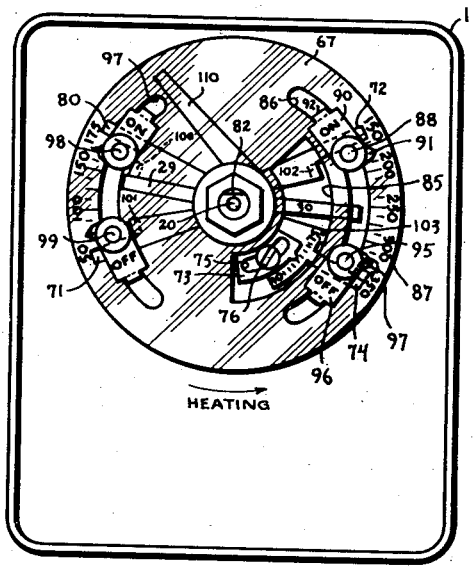
Figure 1 is a front elevation of the switch actuators and adjusting disk, the switches and associated structure having been omitted for the sake of clarity.

The switching mechanism of my invention has been shown as mounted within the switch casing 11 which is provided with the usual cover 12 shown as removably mounted by some suitable means such as the catch 13 and screw 14. Secured to the back of the casing 11 by any suitable means such as is shown at 15 is a tubular supporting member 16. A coiled bimetallic thermostat 18 is shown as being secured at one end to the tubular support 16 by means of the screw 19. The other end of the bimetallic element 18 is secured to a rod 20 by means of the screw 21. On an increase in temperature the bimetallic element 18 will unwind and rotate the rod 20 in a counterclockwise direction as viewed in Figure 1.

The back of the casing 11 is provided with a hole 23 in which a sleeve 24 is suitably mounted as indicated at 25. The rod 20 extends longitudinally through the bimetallic element 18, support 16, and through the sleeve 24 within the interior of the casing 11.

Figure 2:
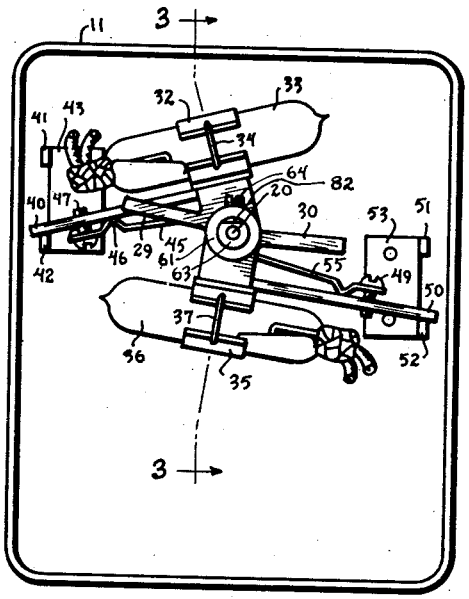
Figure 2 is a front elevation of the switches and their mountings with the actuating disk assembly removed.
Figure 3:
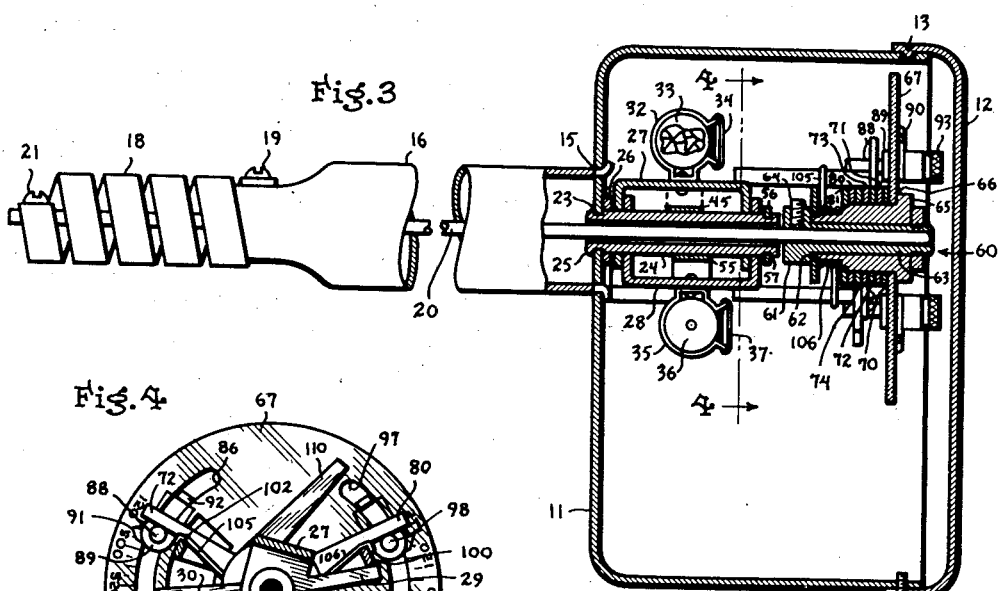
Figure 3 is a sectional view through the entire mechanism taken on the line 3—3 of Figure 2, the mercury switches and clips being shown in elevation.
Figure 4:
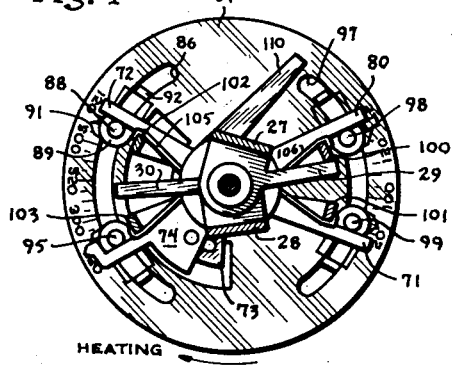
Figure 4 is a detailed section of the mechanism taken along the line 4—4 of Figure 3 and looking in the direction of the arrows.

Mounted within the casing 11 on the sleeeve 24 is a bearing washer 26. Also mounted on sleeve 24 is a pair of brackets 27 and 28 which are freely rotatable with respect to the sleeve 24. Bracket 27 is provided with an actuating arm 29 and the bracket 28 is provided with an actuating arm 30. Suitably secured to the bracket 27 is a mercury switch clip 32 which carries the mercury switch 33 which is held therein by means of the wire 34. Likewise, the bracket 28 supports mercury switch clip 35 which carries the mercury switch 36 which is held therein by means of the wire 37. The bracket 27 is provided with a second arm 40 which cooperates with two stops 41 and 42 which are formed on the bracket 43 which is secured to the back of the casing 11. As seen in Figure 2, when arm 40 is in engagement with the stop 42 the mercury switch 33 is in closed circuit position and when the arm 40 is in engagement with the stop 41 the switch 33 will be in open circuit position. A leaf spring 45 having a bearing portion 46 is adjustably secured to the arm 40 by means of the screw 47. The inner end of the arm 45 forceably engages the sleeve 24 as indicated in Figure 3 and the amount of force so exerted by the arm 45 is adjustable by the screw 47. The function of this arm is to provide a predetermined resistance to movement of the mercury switch 33 to maintain it in its actuated position until it is positively actuated by arm 29 to another position.

The bracket 28 is likewise provided with an arm 50 similar to the arm 40 which cooperates with stops 51 and 52 on bracket 53 which is secured to the back of the casing 11. The arm 50 is also provided with a leaf spring 55 for frictionally resisting the movement of the bracket 28 by means of its cooperation with the sleeve 24 as shown in Figure 3. Spring 55 is shown as adjustable by means of screw 49.

A spring clip 56 is mounted in the groove 57 at the end of the sleeve 24 to maintain the brackets 27 and 28 in assembled relation on the sleeve 24.

Mounted on the end of the rod 20 is a mounting member in the form of a sleeve 60. This sleeve is provided with an enlarged end 61 which has a shoulder 62, and an elongated reduced portion 63. The head 61 receives a screw 64 which engages the rod 20 to adjustably position the sleeve 60 on the rod.

Mounted on the reduced portion 63 of the sleeve 60 and abutting the shoulder 62 is a hub 65 having a shoulder 66. Mounted on the hub 65 and engaging the shoulder 66 is a disk 67 which may be made of a transparent material for a purpose which will be described later. Also mounted on the hub 65 against the disk 67 is a bearing washer 70 and against the bearing washer is mounted a first actuator 71. The actuator 71 is freely rotatable on the hub 65. Rotatably mounted adjacent the actuator 71 is a second actuator 72 and adjacent this actuator is an arm 73 which is adjustably secured to a third actuator 74 also rotatably mounted on the hub. The adjustable connection takes the form of an arcuate slot 75 in the arm 73 through which extends the screw 76 which is screw-threaded in the actuator 74. When the screw 76 is loosened in the slot the members 73 and 74 may be relatively adjusted by rotating one of them with respect to the other and sliding the screw 76 in the slot 75. After they have been brought into adjustment the screw 76 is then tightened to maintain them in this relation.

Rotatably mounted on the hub against the actuator 74 is a fourth actuator 80 and these members are maintained in assembled relation by means of a bearing washer 81 which is suitably fastened to the hub 65. The hub 65 and the sleeve 60 are made non-rotatable with respect to each other by means of a flat portion 82 on the sleeve 60 with which the hub 65 cooperates as seen in Figures 1, 2, and 3.

Referring again to Figure 1, it will be seen that the disk 67 is provided with a first slot 85 through which access may be had to the screw 76 for relatively adjusting the members 73 and 74. The disk 67 is provided with a second arcuate slot 86 which has a scale as indicated at 87. A pin 88 extends through the slot 86 and as seen in Figure 3, this pin is provided with a flange 89 to prevent it from slipping through the slot 86. Mounted over the pin on the other side of the disk 67 from the flange 89 is a clip 90 which is provided with a pointer 91 for cooperation with the scale 87 and a finger 92 which extends downwardly through the slot 86 to maintain the clip in a predetermined relationship with the slot 86. A nut 93 is screwed on the pin 88 so that the flange 89 and clip 90 may be tightened against the disk 67 to maintain pin 88 in any adjusted position along the slot 86. The clip 90 has the word "On" written on it to indicate that the adjustment of this pin determines the temperature value at which the switch 36 is moved to "on" position.

Also adjustably mounted in the slot 86 is a second pin 95 which is substantially identical with the pin 88. The pin 95 is also provided with a clip 96 having a pointer 97 for indicating the temperature value at which the switch 36 will be moved to "off" position.

A second arcuate slot 97 is located in the disk 67 opposite the slot 86. The slot 97 is provided with a pin 98 which is a duplicate of the pin 88 and a pin 99 which is a duplicate of the pin 95. Pins 88, 95, 98, and 99 are all supplied with indicating pointers and are all adjustable in the same manner. The adjustment of the pin 88 determines the temperature at which the switch 36 will be moved to "on" position and the adjustment of the pin 95 determines the temperature at which the switch 36 will be moved to "off" position. The actuating member 80 is provided with a rearwardly extending arm 100 which cooperates with the arm 29 on the bracket 27 to actuate the switch 33 to "on" position. The actuating member 71 is provided with a rearwardly extending arm 101 which cooperates with the arm 29 to move switch 33 to "off" position. The actuating member 72 is provided with a rearwardly extending arm 102 which cooperates with the arm 30 on bracket 28 to move the switch 36 to "on" position and the actuating member 74 is provided with a rearwardly extending arm 103 which cooperates with arm 30 to move switch 36 to "off" position.

As the actuating members are all freely rotatable on the hub 65 some means must be provided for rotating them by the rod 20. This means takes the form of a spring wire 105 which engages at one end the arm 102 of the actuating member 72 and at the other end the arm 103 of the actuating member 74. The intermediate portion of the wire is wound around the hub 65 as indicated in Figure 3 and the effect is that the actuating members 72 and 74 are resiliently held in engagement with the pins 88 and 95, respectively. The wire 105 exerts sufficient force so that as the rod 20 is rotated the arms 102 and 103 actuate the switch 36 and on continued movement of the rod 20 the wire flexes to permit the pins 88 and 95 to separate from the actuating members.

A second wire 106 is provided for engaging the arm 100 at one end and arm 101 at the other end for resiliently forcing the actuating members 80 and 71 into engagement with the pins 98 and 99, respectively.

It will be seen that the member 73 has an extension arm 110 which will eventually engage the pin 98 if the pins 95 and 98 should be adjusted upwardly in their slots 86 and 97. The purpose of this is to provide a mechanical interlock between the adjustments of the pins 95 and 98 so that the pin 95 cannot be set to a lower temperature value than the pin 98. It will also be seen that if the pin 95 were removed the movement of the arm 103 under the influence of its biasing spring would be limited only by the engagement of the arm 110 with the pin 98. In this manner the single adjustment of the pin 98 will not only adjust the temperature value at which the switch 33 will be moved to "on" position but it will also adjust the temperature value at which the switch 36 will be moved to "off" position. The differential between these two values is adjusted by means of the screw 76 and the slot 75.

It will be appreciated that Figure 1 omits the showing of the switches 33 and 36 which are shown in Figure 2 so that this figure will not be confused by the showing of too many overlapping parts and that in Figure 2 the disk 67 and the actuating members have been removed in order that the switch mounting will show up more clearly. Actually, as can be seen from an inspection of Figure 3, the disk and the actuating member assembly is placed on the end of the rod 20 over the switch assembly.

The switch 33 may be used to control a fan as set forth in the objects of the invention and the switch 36 may be used as a limit control for the heater. In such a case the position of the switches as shown in Figure 2 would indicate the normal operating temperature at which time the air temperature in the bonnet of the furnace will be sufficiently high to warm the rooms of the house if introduced therein and therefore the fan switch 33 is in closed position. The temperature of the air, however, is not dangerously high and therefore the limit switch remains closed. In the event that the heater for the furnace is energized the temperature of the air will increase which will cause the bimetallic element 18 to unwind and rotate the disk 67 in a counter-clockwise direction. As the arm 40 on the bracket 27 is engaging the stop 42 the arm 29 cannot be swung further in a counter-clockwise direction by the arm 100. The arm 29 will therefore prevent further movement of the actuator 80 and its arm 100 and continued rotation of the disk 67, which is permitted by the strain release spring 106 will cause pin 98 to separate from actuator 80. On further rotation of the disk 67 in a counter-clockwise direction the arm 103 will engage arm 30 and raise it until the limit switch 36 has been moved to open position and the arm 50 moved into engagement with the stop 51. This will deenergize the heater and cause a reduction in temperature which in turn will cause the bimetallic element 18 to wind up and rotate the disk 67 in a clockwise direction. Due to the effect of the spring arm 55 the switch 36 will remain in its actuated position until the arm 102 on the actuator 72 engages arm 30 to positively move the switch 36 to closed position. Thus it is seen that the temperature at which the switch 36 is moved to open position is determined by the position of the arm 103 which is controlled by the position of the pin 95. Also the temperature at which the switch is moved to "on" position is determined by the position of the arm 102 which is controlled by the adjustable pin 88.

Assuming that the room thermostat in control of the heater is satisfied, the heater will be deenergized and the air temperature will continue to fall. If the heater remains deenergized long enough the temperature of the air will fall to a point where it is no longer capable of heating the house if forced therethrough. In this event it would not be desirable to energize the fan immediately upon the room temperature calling for heat and in order to prevent this the fan switch 33 is opened. This is accomplished by the arm 101 engaging the arm 29 and raising it until the switch 33 moves to open position and the arm 40 engages the stop 41. Any further movement of the disk 67 in a clockwise direction is permitted by the wires 105 and 106 flexing. It is seen therefore that the temperature at which the switch 33 is moved to open position is determined by the position of the arm 101 which is controlled by pin 99 and the temperature at which the switch 33 is moved to closed position is determined by the position of the arm 100 which is controlled by the pin 98. As the pins 88, 95, 98, and 99 are each individually adjustable it is clear that in this instrument the opening and closing temperatures of each switch are individually adjustable.

As set forth above, it is impossible to adjust the temperature value at which the limit switch will open to a point below that at which the fan switch will be closed due to the arm 110 engaging the pin 98. In some cases it may be desirable to maintain a fixed temperature differential between the closing of the fan switch and the opening of the limit switch. In this event the pin 95 which determines the opening temperature of the limit switch is removed so that the arm 110 is moved into engagement with the pin 98. In this manner the adjustment of the pin 88 controls the position of the arm 100 and also of the arm 103 which arms control the closing of the fan switch and the opening of the limit switch. The adjustment provided by the screw 76 and the slot 75 determines the relative positions of the arm 103 and the arm 100 and in this manner the differential between the closing of the fan switch and the opening of the limit switch may be predetermined.

The disk 67 has been made transparent in this case so that the person making the various adjustments can see the positions occupied by the actuating members and in addition see the positions of the mercury switches and the arms by which they are moved. In this manner he can determine the exact condition of the switching mechanism at the time he is making the adjustment.

Various changes and modifications in this mechanism may occur to those who are skilled in the art and it is therefore to be understood that I am to be limited by the scope of the appended claims and not by the specific embodiment disclosed.

I claim as my invention:

1. In a device of the character described comprising in combination, a member movable in accordance with the variations of a variable condition, a plurality of switches moved to open and closed positions by said member, and means for adjusting the condition values at which said member moves each switch to both open and closed positions, said means including an interlock preventing one of said switches from being adjusted to be moved to closed position at a condition value higher than that at which another of said switches is moved to open position.

2. In a device of the character described comprising in combination, first and second switches, a member movable in accordance with the variations of a variable condition, a first pair of actuators movable by said member for actuating said first switch to open and closed positions respectively, a second pair of actuators movable by said member for actuating said second switch to open and closed positions respectively, and means for individually adjusting each actuator independently of the others, said means including an interlock preventing one of said switches from being adjusted to be moved to closed position at a condition value higher than that at which said other switch is moved to open position.

3. In a device of the character described comprising in combination, a first switch of the type which must be positively moved in each direction, a member movable in accordance with the variations in a variable condition, a first actuator for actuating said switch to a first position, a second actuator for actuating said switch to a second position, connections between said actuators and said member, and a second switch actuated by said member, at least one of said connections including a strain release whereby said member may actuate said first switch and then continue its movement to actuate said second switch.

4. In a device of the character described comprising in combination, a first switch of the type which must be positively moved in each direction, a member movable in accordance with the variations in a variable condition, a first actuator for actuating said switch to a first position, a second actuator for actuating said switch to a second position, connections between said actuators and said member, a second switch actuated by said member, at least one of said connections including a strain release whereby said member may actuate said first switch and then continue its movement to actuate said second switch, and means for adjusting said actuators with respect to said member.

5. In a device of the character described comprising in combination, a first switch of the type which must be positively moved in each direction, a member movable in accordance with the variations in a variable condition, a first actuator for actuating said switch to a first position, a second actuator for actuating said switch to a second position, connections between said actuators and said member, a second switch actuated by said member, at least one of said connections including a strain release whereby said member may actuate said first switch and then continue its movement to actuate said second switch, means for individually adjusting each of said actuators with respect to said member, and means for varying the value of the condition at which said member will actuate said second switch.

6. In a device of the character described comprising in combination, a first switch of the type which must be positively moved in each direction, a member movable in accordance with the variations in a variable condition, a first actuator for actuating said switch to a first position, a second actuator for actuating said switch to a second position, connections between said actuators and said member, a second switch actuated by said member, at least one of said connections including a strain release whereby said member may actuate said first switch and then continue its movement to actuate said second switch, means for individually adjusting each of said actuators with respect to said member, means for varying the value of the condition at which said member will actuate said second switch, and an interlock whereby one of said switches cannot be adjusted to be actuated at a higher value of said condition than the other switch.

7. In a device of the character described comprising in combination, first and second switches of the type which must be positively moved in each direction, a member movable in accordance with the value of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position.

8. In a device of the character described comprising in combination, first and second switches of the type which must be positively moved in each direction, a member movable in accordance with the value of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position, and means for individually adjusting each of said actuators with respect to said member.

9. In a device of the character described comprising in combination, first and second switches of the type which must be positively moved in each direction, a member movable in accordance with the valve of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position, means for individually adjusting each of said actuators with respect to said member, and an interlock preventing the adjustment of said first actuator to close said first switch at a higher condition value than that at which said third actuator opens said second switch.

10. In a device of the character described comprising in combination, first and second switches of the type which must be positively moved in each direction, a member movable in accordance with the value of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position, means for individually adjusting each of said actuators with respect to said member, an interlock preventing the adjustment of said first actuator to close said first switch at a higher condition value than that at which said third actuator opens said second switch, and means for adjusting said interlock whereby the minimum differential between the closing of said first switch and the opening of said second switch may be predetermined.

11. In a device of the character described comprising in combination, first and second switches of the type which must be positively moved in each direction, a member movable in accordance with the value of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position, means for individually adjusting each of said actuators with respect to said member, and an interlock between the adjusting means for said first and third actuators providing a predetermined minimum differential between the adjustments of said last named actuators, any further adjustment of said first actuator after said predetermined differential has been reached causing a corresponding adjustment of said third actuator to maintain said predetermined minimum differential.

12. In a device of the character described comprising in combination, first and second switches of the type which must be positively moved in each direction, a member movable in accordance with the value of a variable condition, first, second, third, and fourth actuators for said switches, and connections including strain release means between said member and actuators, the arrangement being such that on an increase in the value of said condition said first actuator actuates said first switch to closed position and then said third actuator actuates said second switch to open position, and on a decrease in the value of said condition said fourth actuator actuates said second switch to closed position and then said second actuator actuates said first switch to open position, means for individually adjusting each of said actuators with respect to said member, an interlock between the adjusting means for said first and third actuators providing a predetermined minimum differential between the adjustments of said last named actuators, any further adjustment of said first actuator after said predetermined differential has been reached causing a corresponding adjustment of said third actuator to maintain said predetermined minimum differential, and means for rendering the adjusting means for said third actuator ineffective whereby said third actuator is under the control of the adjusting means for said first actuator at all times.

13. In a combined fan and high limit control, a fan switch, a limit switch, a member movable in accordance with variations in temperature, connecting means between said member and said switches, and means associated with said connecting means for individually varying the temperature at which said fan switch is moved to closed position and the temperature at which it is moved to open position, and the temperature at which said limit switch is moved to closed position and the temperature at which it is moved to open position, said last mentioned means including an interlock rendering it impossible to adjust said fan switch to close at a higher temperature than that at which said limit switch opens.

14. In a device of the character described comprising in combination, a rod, a device rotating said rod in accordance with the variations of a variable condition, a first mercury switch, means mounting said switch for rotation concentrically about said rod, first and second actuators comprising arms yieldably connected to said rod, said first actuator actuating said switch to open position, said second actuator actuating said switch to closed position, means for individually adjusting said actuators, a second mercury switch, and actuating means for said second switch also yieldably connected to said rod, said second mercury switch being actuated by said actuating means independently of said first mercury switch.

15. In a device of the character described comprising in combination, a rod, a device rotating said rod in accordance with the variations of a variable condition, first and second mercury switches, means mounting said switches for rotation about said rod, first and second actuators for moving said first switch to open and closed positions respectively, third and fourth actuators for moving said second switch to open and closed positions respectively, means connecting said actuators to said rod including strain release means whereby said rod may continue rotating to actuate one switch after the other switch has already been actuated.

16. In a device of the character described comprising in combination, a rod, a device rotating said rod in accordance with the variations of a variable condition, first and second mercury switches, means mounting said switches for rotation about said rod, first and second actuators for moving said first switch to open and closed positions respectively, third and fourth actuators for moving said second switch to open and closed positions respectively, means connecting said actuators to said rod including strain release means whereby said rod may continue rotating to actuate one switch after the other switch has already been actuated, and means for individually adjusting each of said actuators, said last mentioned means including an interlock making it impossible to adjust one switch to close at a higher condition value than that at which the other switch opens.

17. In a device of the character described comprising in combination, a casing, a rod extending within said casing, a device rotating said rod in accordance with the variations of a variable condition, a switch of the type which must be positively moved to each operative position, first and second actuators connected by strain release means to said rod for actuating said switch to open and closed positions respectively, a plate mounted on said rod over said actuators, and means carried by said plate for individually adjusting each actuator, said plate being of transparent material whereby the position of said actuators and switch is exposed to view.

18. In a device of the character described comprising in combination, a plurality of switches, a member movable in accordance with the variations of a variable condition, a plurality of actuators movable by said member for actuating said switches to open and closed positions, and means for individually adjusting each actuator independently of the others, said means including an interlock preventing one of said switches from being adjusted to be moved to closed position at a condition value higher than that at which another of said switches is moved to open position.

19. In a device of the character described comprising in combination, a plurality of switches, at least one of said switches being of the type which must be positively moved in each direction, a member movable in accordance with the variations of a variable condition, a plurality of actuators, one of said actuators being adapted to move said one positively moved switch to a first position, another of said actuators being adapted to move said one switch to a second position, and connections between said actuators and said member, the remaining switch or switches being actuated by said member, at least one of said connections including a strain release whereby said member may actuate said one positively moved switch and then continue its movement to actuate another of said switches.

20. In a device of the character described comprising in combination, a member including yieldable actuating arms movable in accordance with the variations of a variable condition, a plurality of switch elements mounted to rotate concentrically about said member and moved by said arms, means for independently adjusting the condition values at which said arms move at least one switch to both open and closed positions, and interlock means for preventing one of said arms from moving another of said switches to open position at a condition value higher than that at which said one switch is moved to closed position.

21. In a combined fan and high limit control, a fan switch, a limit switch, a member movable in accordance with variations in temperature, connecting means between said member and said switches, and means associated with said connecting means for individually varying the temperature at which said fan switch is moved to closed position and the temperature at which it is moved to open position, and the temperature at which said limit switch is moved to open position, said last mentioned means including an interlock rendering it impossible to adjust said fan switch to close at a higher temperature than that at which said limit switch opens.

CARL G. KRONMILLER.